(12) United States Patent
Suga et al.

(10) Patent No.: US 9,296,890 B2
(45) Date of Patent: Mar. 29, 2016

(54) CURABLE COMPOSITION

(71) Applicant: Toray Fine Chemicals Co., Ltd., Urayasu-shi (JP)

(72) Inventors: Yasukazu Suga, Ichihara (JP); Yukiko Hamada, Ichihara (JP); Kazunori Matsumoto, Hebei (CN); Rika Umano, Ichihara (JP)

(73) Assignee: Toray Fine Chemicals Co., Ltd. (JP)

( * ) Notice: Subject to any disclaimer, the term of this patent is extended or adjusted under 35 U.S.C. 154(b) by 0 days.

(21) Appl. No.: 14/362,154

(22) PCT Filed: Dec. 5, 2012

(86) PCT No.: PCT/JP2012/081462
§ 371 (c)(1),
(2) Date: Jun. 2, 2014

(87) PCT Pub. No.: WO2013/089000
PCT Pub. Date: Jun. 20, 2013

(65) Prior Publication Data
US 2014/0336340 A1    Nov. 13, 2014

(30) Foreign Application Priority Data

Dec. 15, 2011 (JP) ................. 2011-274070

(51) Int. Cl.
| | | |
|---|---|---|
| C08F 283/00 | (2006.01) | |
| C08L 63/00 | (2006.01) | |
| C08G 59/56 | (2006.01) | |
| C08G 59/66 | (2006.01) | |
| C08L 81/04 | (2006.01) | |

(52) U.S. Cl.
CPC ............... *C08L 63/00* (2013.01); *C08G 59/56* (2013.01); *C08G 59/66* (2013.01); *C08L 81/04* (2013.01)

(58) Field of Classification Search
CPC ................................. C08L 81/04; C08L 63/00
USPC ............................................ 568/21; 528/373
See application file for complete search history.

(56) References Cited

U.S. PATENT DOCUMENTS

| | | | |
|---|---|---|---|
| 2,466,963 A | 4/1949 | Patrick et al. | |
| 3,316,324 A | 4/1967 | Mendoyanis | |
| 4,214,067 A | 7/1980 | Packer | |
| 2003/0050511 A1* | 3/2003 | Gilmore et al. | 568/21 |

FOREIGN PATENT DOCUMENTS

| | | |
|---|---|---|
| JP | 55-137127 A | 10/1980 |
| JP | 59-232117 A | 12/1984 |
| JP | 63-183979 | 7/1988 |
| JP | 63-183979 A | 7/1988 |
| JP | 11-060693 A | 3/1999 |
| JP | 2003-128645 A | 5/2003 |

OTHER PUBLICATIONS

Japanese Office Action (Rejection) dated Jul. 7, 2015 from corresponding Japanese Patent Application No. 2013-500268.
Extended European Search Report dated Jul. 16, 2015 from corresponding European Patent Application No. 12858543.

* cited by examiner

*Primary Examiner* — Shane Fang
(74) *Attorney, Agent, or Firm* — DLA Piper LLP (US)

(57) ABSTRACT

The curable composition is a curable composition including a liquid polysulfide polymer containing 8% by weight or more of thiol groups in one molecule, an epoxy resin, and an amine, in which the liquid polysulfide polymer is

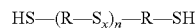

wherein R is a two valent or three valent organic group containing a —O—CH$_2$—O— bond, the average of n is less than 10, x is an integer of 1 to 5, and the average of x is 1 to 2.5.

3 Claims, No Drawings

CURABLE COMPOSITION

TECHNICAL FIELD

This disclosure relates to a curable composition containing a liquid polysulfide polymer containing two or more thiol groups in one molecule, an epoxy resin, and an amine. Particularly, the disclosure relates to an epoxy resin-based curable composition in which the liquid polysulfide polymer has a high terminal thiol group content, low viscosity, rise of the hardness is fast, and flexibility is large.

BACKGROUND

A liquid polysulfide polymer has thiol groups at the terminal end and is easily oxidized by an oxidizing agent such as lead dioxide and manganese dioxide and cured. A cured rubbery material obtained by curing a polysulfide polymer contains sulfur and does not contain a double bond in the main chain of the molecule, thus is excellent in oil resistance, weather resistance, water tightness and gas tightness, and is also good in adhesion. Thus, it is widely used as a sealant, adhesive and paint.

A liquid polysulfide polymer has high compatibility with an epoxy resin, and can be mixed with an epoxy resin at various rates, and a curable composition can be obtained by adding an amine to the liquid polysulfide polymer. Polysulfide polymer addition to an epoxy resin has an effect of providing flexibility to a hard and brittle epoxy resin cured material to improve adhesion. It is known that, when a liquid polysulfide polymer is added to an epoxy resin composition as a primer to join old and new concrete, adhesion to a wet surface is improved, and cohesion after being cured is good. When a polysulfide polymer is added to an epoxy resin, adhesion to a hardly adhesive rubber is improved. Furthermore, when a mixture of an epoxy resin and a polysulfide polymer is added to a sealant, resistance of the sealant is improved for long periods.

The most common method of producing a liquid polysulfide polymer is a method obtaining a liquid polymer via solid polysulfide described in U.S. Pat. No. 2,466,963.

In the method of producing a liquid polysulfide polymer via solid polysulfide, molecules are cleaved to form terminal groups and, at the same time, solid is liquidified. When the thiol group content is increased, the molecular weight of the liquidified polymer is decreased, but control of the molecular weight becomes difficult, and the content of thiol groups is consequently restricted. Furthermore, when attempting to increase the thiol content at the terminal end, a large amount of a liquidifying agent is necessary. Thus, there are problems that the production cost is high, and a large amount of high-load wastewater is generated from the process and adversely affects on the environment. In addition, qualities such as color and smell also deteriorate. Therefore, the thiol group content that can be produced as a business has been limited to currently commercially available "Thiokol LP-3" (thiol group content, 5.9 to 7.7% by weight) having a viscosity range of 990 to 1340 mPa·s (25° C.).

A commercial product of a liquid polysulfide polymer produced by an existing production method has a long main chain relative to the thiol group. Thus, the reaction with an epoxy group is mild and, sometimes, hardening is too slow and, particularly, an increase in hardness is insufficient, depending on the intended use. In addition, in a commercial product of a liquid polysulfide polymer produced by an existing production method, sometimes, the viscosity is too high. Thus, an organic solvent that poses environmental concerns is necessary, depending on the intended use.

As a compound that can rapidly react a thiol group with an epoxy group, terminal-thiol group-containing compounds that do not contain a polysulfide structure in the main chain have been reported. Among them, as a curing agent of an epoxy resin having both economic efficiency and safety, a compound having a polyether structure in the main chain and having three or more thiol groups in one molecule is widely commercially available. Examples include "Polythiol QE-340M" manufactured by Toray Fine Chemicals Co., Ltd., "Capcure 3-800" manufactured by BASF Japan Ltd., and "GPM-800" manufactured by Gabriel Performance Products. These terminal-thiol group-containing polyether compounds have an average thiol group content of 12% by weight and viscosity of 7000 to 18000 mPa·s (25° C.). These commercial products of terminal-thiol group-containing polyether compounds are used for various usages, and characterized in having high thiol group content and having high hardenability. However, since these compounds do not have a polysulfide structure in the main chain, there are problems of poor performance in flexibility, water resistance, chemical resistance, weather resistance, and adhesion compared to when a terminal-thiol group-containing liquid polysulfide polymer is used.

SUMMARY

We provide an epoxy resin curable composition having low viscosity and sufficient flexibility in which the hardness at initial hardening has a high achievement degree relative to the final hardness.

The curable composition is a curable composition containing a liquid polysulfide polymer containing 8% by weight or more of two or more thiol groups in one molecule, an epoxy resin, and an amine, in which the liquid polysulfide polymer is

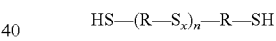

$$HS-(R-S_x)_n-R-SH$$

wherein R is a two valent or three valent organic group containing a —O—CH$_2$—O— bond, the average of n is less than 10, x is an integer of 1 to 5, and the average of x is 1 to 2.5.

The curable composition has a rapid increase in hardness and is rapidly cured. The curable composition has low viscosity before being cured. The curable composition is good in flexibility, water resistance, chemical resistance, weather resistance and adhesion after being cured.

The curable composition is fast to increase in hardness at initial hardening compared to a conventional composition of a liquid polysulfide polymer containing two or more thiol groups in one molecule, an epoxy resin, and an amine. Furthermore, flexibility, water resistance, chemical resistance, weather resistance and adhesion after being cured are improved, which are a defect of a composition of a terminal-thiol group-containing polyether compound that does not have a polysulfide structure, an epoxy resin and an amine.

The curable composition is characterized by a fast increase in hardness during curing, having low viscosity, and having excellent flexibility, water resistance, chemical resistance and weather resistance, and is also good in adhesion. Thus, it can be used for an adhesive, sealant, potting material, coating material, modifier for resin, primer, and the like. The curable composition is optimally used, particularly as an adhesive for civil engineering and construction, a coating material for civil engineering and construction, a primer for civil engineering and construction, an adhesive for electrical and electronic applications, a potting material for electrical and electronic applications, an adhesive for vehicles, and a primer for vehicles.

DETAILED DESCRIPTION

Hereinbelow, our compositions will be described in detail.

The liquid polysulfide polymer containing two or more thiol groups in one molecule used in the curable composition is a polymer represented by the following formula,

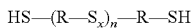

$$HS-(R-S_x)_n-R-SH$$

wherein R is a two valent or three valent organic group containing a —O—CH$_2$—O— bond, the average of n is less than 10, x is an integer of 1 to 5, and the average of x is 1 to 2.5.

R is preferably an organic group containing —O—CH$_2$—O— bond and a branched alkylene group. R preferably contains

$$-C_2H_4-O-CH_2-O-C_2H_4-$$

in an amount of 50% by mol or more. R further preferably contains

$$-C_2H_4-O-CH_2-O-C_2H_4-$$

in an amount of 70% by mol or more.

When R is an organic group containing a branched alkylene group, the branched alkylene group is preferably 0 to 70% by mol, based on the number of moles of the —O—CH$_2$—O— bond.

The branched alkylene group is preferably a multifunctional component derived from a trihalo organic compound, and an organic group represented by

$$-CH_2CHCH_2-.$$
$$\phantom{-CH_2C}|$$

Preferred branched trihalo organic compound is a trihalo alkyl compound, and more preferred branched trihalo organic compound is a trihalo propane. Preferred halogen atom of the trihalo propane is chlorine, bromine and iodine, and more preferred halogen atom is a chlorine atom.

In the liquid polysulfide polymer containing two or more thiol groups in one molecule used in the curable composition, x is an integer of 1 to 5, and the average of x is 1 to 2.5. The average of x is preferably 1.1 to 2.0, more preferably 1.1 to less than 2, further preferably 1.1 to 1.9, and further more preferably 1.1 to 1.8. Particularly, when the average of x is less than 2, preferably 1.1 to 1.9, and more preferably 1.1 to 1.8, the polymer has low viscosity, low glass-transition temperature, and high thermal resistance, as compared to a commercially available conventional liquid polysulfide polymer, and thus a curable composition having low viscosity, low glass-transition temperature and high thermal resistance is obtained.

In liquid polysulfide polymer containing two or more thiol groups in one molecule used in the curable composition, the thiol group content is 8% by weight or more, and preferably 9% by weight or more and 20% by weight or less.

The liquid polysulfide polymer containing two or more thiol groups in one molecule used in the curable composition has viscosity of preferably 900 mPa·s or less, and more preferably 200 to 900 mPa·s.

The average of n is less than 10, and preferably 1 to 6 in the liquid polysulfide polymer containing two or more thiol groups in one molecule used in the curable composition.

The liquid polysulfide polymer used in the curable composition is preferably produced without formation of solid polysulfide. For example, high thiol content and low viscosity are facilitated by producing a liquid polysulfide polymer by a method using a phase transfer catalyst without formation of solid polysulfide.

In a liquid polysulfide polymer produced by forming solid polysulfide, the more the thiol content increases, the thicker the color, and the more the smell (bad smell) increases. On the other hand, in a liquid polysulfide polymer produced by a method without formation of solid polysulfide using a phase transfer catalyst, color and smell do not deteriorate with the increase in the thiol content.

The representative color of the liquid polysulfide polymer containing two or more thiol groups in one molecule used in the curable composition is preferably 1 to 9, and further preferably 1 to 3 in color number, measured by a Hellige colorimeter.

The liquid polysulfide polymer used in the curable composition is preferably produced using a phase transfer catalyst. The liquid polysulfide polymer used in the curable composition is more preferably produced using a phase transfer catalyst and without formation of solid polysulfide.

Preferred phase transfer catalyst is quaternary ammonium salts, phosphonium salts and crown ethers, and more preferred phase transfer catalyst is methyltributylammonium halides, tetrabutylammonium halides, tetraphenylphosphonium halides and 18-crown-6. Most preferred phase transfer catalyst is tetrabutylammonium chloride, tetrabutylammonium bromide, methyltributylammonium chloride and methyltributylammonium bromide. The preferred amount of the phase transfer catalyst is 0.0001 to 0.1 mol and more preferably 0.0002 to 0.02 mol, per 1 mol of an organic group of R constituting the liquid polysulfide polymer.

The liquid polysulfide polymer containing two or more thiol groups in one molecule can be also obtained by reacting a terminal halide with sodium hydrosulfide.

The sulfur content x of the liquid polysulfide polymer containing two or more thiol groups in one molecule is determined by adjustment of sodium sulfide when starting the reaction and can be adjusted by mixing sodium monosulfide (Na$_2$S) and sodium polysulfide (Na$_2$S$_x$: x is 2 or more) in arbitrary proportion. Sodium monosulfide and sodium polysulfide, those adjusted by any convenient method such as combinations of sodium hydrosulfide, sodium hydroxide and sulfur, can be used.

The epoxy resin includes epoxy resins obtained by adding epichlorohydrin to a polyhydric phenol such as bisphenol A, bisphenol F, resorcinol, hydroquinone, pyrocatechol, 4,4-dihydroxybiphenyl or 1,5-hydroxy naphthalene, epoxy resins obtained by adding epichlorohydrin to a polyhydric alcohol such as ethylene glycol, propylene glycol or glycerin, epoxy resins obtained by adding epichlorohydrin to an aromatic dicarboxylic acid such as oxybenzoic acid or phthalic acid, polysulfide polymers having an epoxy group at the terminal (trade names "FLEP-50," "FLEP-60" both manufactured by Toray Fine Chemicals Co., Ltd.) and the like, and those that are a liquid form at room temperature are preferred.

The epoxy resin can be blended in arbitrary proportion, depending on properties of the cured material to be designed, and is preferably blended in an amount of 100 to 1000 parts by weight, based on 100 parts by weight of the liquid polysulfide polymer containing two or more thiol groups in one molecule. When the blending amount of the epoxy resin is 100 to 1000 parts by weight, based on 100 parts by weight of the liquid polysulfide polymer containing two or more thiol groups in one molecule, a cured material has sufficient hardness and fracture stress and sufficient flexibility. The blending amount of the epoxy resin is more preferably 100 to 700 parts by weight, and further more preferably 100 to 600 parts by weight, based on 100 parts by weight of the liquid polysulfide polymer containing two or more thiol groups in one molecule.

The amine may be those known as a normal curing agent for an epoxy resin and a catalyst which include aliphatic diamines such as ethylenediamine, diethylenetriamine, triethylenetetramine, pentaethylenehexamine, trimethylenediamine, hexamethylenediamine and tetramethylenediamine, aliphatic tertiary amines such as N,N-dimethylpropylamine and N,N,N',N'-tetramethyl hexamethylene diamine, alicyclic tertiary amines such as N-methylpiperidine and N,N'-dimethyl piperazine, aromatic tertiary amines such as benzyldimethylamine, dimethylaminomethyl phenol and 2,4,6-tris(dimethylaminomethyl) phenol, polyamine epoxy resin adducts manufactured by reacting an epoxy resin with excess amine, polyamine-ethylene oxide adducts, polyamine-propylene oxide adducts, cyanoethylated polyamines, diamines in which the main chain is silicone, or dehydrated condensates obtained by reacting polyamines, phenols, and aldehydes, and the like, imidazoles such as 2-ethyl-4-methylimidazole, modified polyamines, and the like.

The amine is preferably blended in an amount of 1 to 100 parts by weight, based on 100 parts by weight of the epoxy resin. When the blending amount of the amine is 1 to 100 parts by weight, based on 100 parts by weight of the epoxy resin, curing is rapid, and it is advantageous in cost. The blending amount of the amine is more preferably 1 to 80 parts by weight and further more preferably 1 to 60 parts by weight, based on 100 parts by weight of the epoxy resin.

The curable composition may contain, for the purpose of improving economic efficiency, workability when preparing a composition and physical properties after being cured, plasticizers, fillers, multifunctional crosslinking agents, adhesion promoters, UV absorbers, antioxidants, tackifiers, rubber and elastomer, fungicides, corrosion inhibitors, pigments, and masking agents, as necessary.

The plasticizer includes phthalic esters such as dibutyl phthalate, butyl benzyl phthalate and alkyl($C_7$-$C_9$) benzyl phthalate, chlorinated paraffins, dipropylene glycol dibenzoate, diethylene glycol dibenzoate, triethylene glycol dibenzoate, dipropylene glycol monobenzoate, hydrogenated terphenyl, hydrocarbon plasticizers, halogen-terminated sulfur-containing polymers, and the like.

The filler includes inorganic fillers such as calcium carbonate, aluminum oxide, aluminum hydroxide, silica, silicates and sulfates, carbon black, and the like. In addition, the filler includes light weight polymer fillers such as polyamide and polyethylene, hollow fillers such as thermoplastic balloons (thermal expansion microcapsules) such as silica, acrylonitrile, methacrylonitrile and vinylidene chloride, thermosetting balloons such as phenol and epoxy, and inorganic balloons such as shirasu, fly ash, glass and alumina, and the like. Two or more kinds of the fillers may be used, and the fillers on which surface is treated with a fatty acid, a resin acid, a surfactant, a silane coupling agent, paraffin or the like may be used. Calcium carbonate is preferably heavy calcium carbonate and colloidal calcium carbonate. In general, heavy calcium carbonate is a calcium carbonate obtained by mechanically pulverizing and classifying ore of limestone to have a desired particle size distribution. In addition, colloidal calcium carbonate is a calcium carbonate obtained by burning ore of limestone together with coke or the like to once prepare calcium oxide (quicklime), reacting the calcium oxide with water to produce calcium hydroxide (slaked lime), reacting calcium hydroxide with carbonate gas generated during calcination, to have a desired particle size and particle shape.

The multifunctional crosslinking agent includes trimethylolpropane trimercaptopro-pionate, trimethylolpropane trimercaptoacetate, pentaerythritol-tetrakis-3-mercaptopropionate, and the like. Two or more kinds of the multifunctional crosslinking agents may be used.

The adhesion promoter includes silane coupling agents containing a hydrolyzable silyl group and a reactive organic functional group. Specifically, the adhesion promoter includes vinyltrimethoxysilane, vinyltriethoxysilane, 2-(3,4-epoxycyclohexyl)ethyltrimethoxysilane, 3-glycidoxypropyltrimethoxysilane, 3-glycidoxypropylmethyldiethoxysilane, 3-glycidoxypropyl-triethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, N-2(aminoethyl)3-aminopropylmethyldimethoxysilane, N-2(aminoethyl)3-aminopropyltrimethoxysilane, N-2(aminoethyl)3-aminopropyltriethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, 3-mercaptopropylmethyldimethoxysilane, 3-mercaptopropyltrimethoxysilane, bis(triethoxysilylpropyl)tetrasulfide, and the like. In addition, a terminal trimethoxysilane modified polysulfide polymer synthesized by reacting a polysulfide polymer "Thiokol LP-3" with 3-glydoxypropyltrimethoxysilane can be also used as a silane coupling agent. Two or more kinds of these silane coupling agents may be used.

The UV absorber includes benzophenones, benzotriazoles, phenyl salicylates, triazines, nickel salts, and nickel complex salts. Specifically, the UV absorber includes 2-(2-hydroxy-5-methylphenyl)benzotriazole, 2-[2-hydroxy-3(3,4,5,6-tetrahydrophthalimidomethyl)-5-methylphenyl]benzotriazole, 2-(2-hydroxy-3-t-butyl-5-methylphenyl)-5-chlorobenzotriazole, 2-(2-hydroxy-4-octylphenyl)benzotriazole, 2-(2-hydroxy-3,5-t-butylphenyl)benzotriazole, 2-(2-hydroxy-3,5-t-butylphenyl)-5-chlorobenzotriazole, 2-(2-hydroxy-5-t-octylphenyl)benzotriazole, 2-(2-hydroxy-3,5-di-t-amylphenyl)benzotriazole, nickel dibutyl dithiocarbamate, [2,2'-thiobis(4-t-octylphenolate)]-2-ethylhexylamine-nickel, and the like.

Examples of the antioxidant include amine antioxidants, phenolic antioxidants, phosphite antioxidants, and thioether antioxidants. Specifically, the antioxidant includes 1,3,5-tris[[3,5-bis(1,1-dimethylethyl)-4-hydroxyphenyl]methyl]-1,3,5-triazine-2,4,6(1H,3H,5H)-trione, 1,1,3-tris(5-tert-butyl-4-hydroxy-2-methylphenyl)butane, 1,1-bis(4-hydroxy-2-methyl-5-tert-butylphenyl)butane, 2,2-bis[[[3-(3,5-di-tert-butyl-4-hydroxyphenyl)propionyl]oxy]methyl]propane-1,3-diol, 1,3-bis[3-(3,5-di-tert-butyl-4-hydroxyphenyl)propionate], bis(3-tert-butyl-4-hydroxy-5-methylbenzenepropanoic acid)ethylenebis(oxyethylene), 4,4',4"-[(2,4,6-trimethylbenzene-1,3,5-triyl)tris(methylene)]tris(2,6-di-tert-butylphenol), and the like.

The tackifier includes phenol resins, coumarone-indene resins, coumarone resins, naphthenic oils, rosin, rosin esters, hydrogenated rosin derivatives, terpene resins, modified terpene resins, terpene-phenolic resins, hydrogenated terpene resins, a-pinene resins, alkylphenol-acetylene resins, alkylphenol-formaldehyde resins, styrene resins, $C_6$ petroleum resins, $C_9$ petroleum resins, alicyclic petroleum resins, $C_6/C_9$ copolymerized petroleum resins, xylene-formaldehyde resins, and the like.

The flowable additive includes fumed silica, colloidal hydrated aluminum silicate/organic complex, saturated fatty acid (salt) compounds, precipitated calcium carbonate treated with a saturated fatty acid (salt) compound, and the like. The saturated fatty acid (salt) compound includes hexanoic acid, octanoic acid, decanoic acid, lauric acid, myristic acid, palmitic acid, stearic acid, succinic acid, glutaric acid, adipic acid, pimelic acid, sub eric acid, azelaic acid, sebacic acid, and sodium, calcium, and magnesium salts thereof, and the like.

The rubber and elastomer include natural rubbers, polybutadiene rubbers, acrylic rubbers, polyisoprene rubbers, styrene-butadiene rubbers, acrylonitrile-butadiene rubbers, chloroprene rubbers, olefinic elastomers, styrenic elastomers, vinyl chloride elastomers, polyester elastomers, polyamide elastomers, polyurethane elastomers, polysiloxane elastomers, and the like.

In the curable composition, the D hardness after being cured for 7 days is preferably 60 or less and more preferably 20 to 60, at 23° C. atmosphere. In addition, in the curable composition, the hardness after being cured for 1 day is preferably 50% or more, more preferably 50 to 100%, and further preferably 70 to 100% of the hardness after being cured for 7 days.

EXAMPLES

Hereinbelow, our composition will be described in further detail by way of the following examples.

Determination of Viscosity

A sample viscosity at 25° C. was determined using viscometer U-EII manufactured by Toki Sangyo Co., Ltd.

GPC Analysis and Determination of Weight Average Molecular Weight (Mw)

Columns of TSKgel G3000HXL, TSKgel G2000HXL and TSKgel G1000HXL connected in series were used, and detectors of MODEL 504R RI Detector manufactured by GL Sciences Inc. and L-D4000 UV Detector manufactured by Hitachi, Ltd. were used. The sample was dissolved in THF to prepare a 1% THF solution, and the solution was determined at a column temperature of 40° C., using THF at a flow rate of 1.0 ml/min as a mobile phase. The molecular weight was calculated using GPC data processing software SIC48011 data station manufactured by SHOKO Scientific, using PEG as a standard.

Determination of SH Content

A sample was dissolved in a mixed solution of toluene and pyridine, an aqueous solution of potassium iodine was added thereto, and then the mixture was titrated using an iodine standard solution.

Measurement of Color

Using Comparator 705 manufactured by Orbeco-Hellige, Hellige color number was measured.

Determination of Gel Time

All components were weighed and put in a propylene cup, then mixed and stirred using a metal spatula for 1 minute, and cured in a laboratory controlled at 23° C. and 50% RH. The course of the reaction was visually observed, and the mixture was touched from the outside of the propylene cup, whereby the time at which the mixture changed from a liquid to a gel was recorded.

Determination of Tack Free Time

All components were weighed and put in a propylene cup, then mixed and stirred using a metal spatula for 1 minute, uniformly rolled to 0.5 mm thickness on an aluminum plate of 50 mm length×50 mm width×3 mm thickness, and cured in a laboratory controlled at 23° C. and 50% RH. A polypropylene stick was pressed to the surface, and the time at which the aluminum plate was not lifted was recorded.

Measurement of Hardness

The sample cured after determining gel time was demolded from the polypropylene cup, and the surface was smoothed using a metal file. The smoothed sample was cured in a laboratory controlled at 23° C. and 50% RH for 1, 3, and 7 days. After 1, 3, and 7 days, "D hardness" at 23° C. atmosphere was measured and recorded, using "Digital rubber durometer DD2-D" manufactured by KOBUNSHI KEIKI CO., LTD.

Synthetic Example 1

Using a 1 L-separable flask, 622.0 g of an aqueous solution of sodium polysulfide (2.17 mol/L), 2.6 g of a 50 wt % aqueous solution of tetrabutylammonium bromide, 142.4 g of a 42% aqueous solution of sodium hydrosulfide, 154.6 g of water, 271.3 g of bis(2-chloroethyl)formal and 4.7 g of 1,2,3-trichloropropane were reacted at 80° C. for 10 hours, in the presence of 365.6 g of a 16.3 wt % aqueous solution of sodium sulfite, to obtain a pale yellow clear liquid polysulfide polymer, without going through solid polysulfide. The obtained polymer had a repeating unit n of 4.4, a viscosity of 302 mPa·s, Mw by GPC of 907, a SH content of 10.0% by weight, and a Hellige color number of 1.

Synthetic Example 2

Using a 1 L-separable flask, 310.3 g of an aqueous solution of sodium polysulfide (2.17 mol/L), 6.5 g of a 50 wt % aqueous solution of tetrabutylammonium bromide, 77.4 g of a 42% aqueous solution of sodium hydrosulfide, 48.8 g of water, 131.5 g of bis(2-chloroethyl)formal and 5.9 g of 1,2,3-trichloropropane were reacted at 80° C. for 10 hours, in the presence of 182.4 g of a 16.3 wt % aqueous solution of sodium sulfite, to obtain a pale yellow clear liquid polysulfide polymer, without going through solid polysulfide. The obtained polymer had a viscosity of 370 mPa·s, Mw by GPC of 963, a SH content of 9.5% by weight, and a Hellige color number of 1.

Synthetic Example 3

Using a 1 L-separable flask, 310.3 g of an aqueous solution of sodium polysulfide (2.17 mol/L), 6.5 g of a 50 wt % aqueous solution of tetrabutylammonium bromide, 84.0 g of a 42% aqueous solution of sodium hydrosulfide, 50.2 g of water, 124.6 g of bis(2-chloroethyl)formal and 11.8 g of 1,2,3-trichloropropane were reacted at 80° C. for 10 hours, in the presence of 182.4 g of a 16.3 wt % aqueous solution of sodium sulfite, to obtain a pale yellow clear liquid polysulfide polymer, without going through solid polysulfide. The obtained polymer had a viscosity of 430 mPa·s, Mw by GPC of 1030, a SH content of 10.2% by weight, and a Hellige color number of 1.

Synthetic Example 4

Using a 1 L-separable flask, 384.9 g of an aqueous solution of sodium polysulfide (2.18 mol/L), 3.2 g of a 50 wt % aqueous solution of tetrabutylammonium bromide, 99.7 g of a 42% aqueous solution of sodium hydrosulfide, 85.2 g of water, 155.7 g of bis(2-chloroethyl)formal and 14.7 g of 1,2,3-trichloropropane were reacted at 60° C. for 10 hours, in the presence of 223.2 g of a 15.8 wt % aqueous solution of sodium sulfite, to obtain a pale yellow clear liquid polysulfide polymer, without going through solid polysulfide. The obtained polymer had a viscosity of 325 mPa·s, Mw by GPC of 983, a SH content of 12.1% by weight, and a Hellige color number of 1.

Synthetic Example 5

Using a 1 L-separable flask, 320.8 g of an aqueous solution of sodium polysulfide (2.18 mol/L), 3.2 g of a 50 wt % aqueous solution of tetrabutylammonium bromide, 151.3 g of a 42% aqueous solution of sodium hydrosulfide, 83.9 g of water, 138.4 g of bis(2-chloroethyl)formal and 29.4 g of 1,2,3-trichloropropane were reacted at 60° C. for 10 hours, in the presence of 186.0 g of a 15.8 wt % aqueous solution of sodium sulfite, to obtain a pale yellow clear liquid polysulfide polymer, without going through solid polysulfide. The obtained polymer had a viscosity of 226 mPa·s, Mw by GPC of 819, a SH content of 15.6% by weight, and a Hellige color number of 2.

Examples 1 to 5

100 parts by weight of a bisphenol A type epoxy resin (Epikote 828 manufactured by Japan Epoxy Resin Co., Ltd.) and 5 parts by weight of 2,4,6-tris(dimethylaminomethyl) phenol, based on 100 parts by weight of the polymers of Synthetic Examples 1 to 5, were weighed into a propylene cup to be a total of 20 g, and mixed and stirred using a metal spatula for 1 minute, and the gel time and tack free time were determined at 23° C. in an atmosphere of 50% RH. In addition, the hardness after being cured for 1 day, 3 days and 7 days were measured. The hardness after being cured for 1 day, 3 days and 7 days and the achievement degree of the hardness after being cured for 1 day relative to the hardness after being cured for 7 days (ratio of the hardness after being cured for 1 day relative to the hardness after being cured for 7 days) are shown in Table 1.

Comparative Example 1

The gel time, tack free time and hardness were determined in the same manner as in Example 1, using "Thiokol LP-3" manufactured by Toray Fine Chemicals Co., Ltd. as a polymer manufactured by a conventional method going through solid polysulfide in place of the polymer of Synthetic Example 1 in Example 1. The hardness after being cured for 1 day, 3 days and 7 days and the achievement degree of the hardness after being cured for 1 day relative to the hardness after being cured for 7 days are shown in Table 1.

Comparative Example 2

The gel time, tack free time and hardness were measured in the same manner as in Example 1, using "Polythiol QE-340M" manufactured by Toray Fine Chemicals Co., Ltd. as a polymer that does not contain a polysulfide structure in the main chain and contains three or more thiol groups in a one molecule in place of the polymer of Synthetic Example 1 in Example 1. The hardness after being cured for 1 day, 3 days and 7 days and the achievement degree of the hardness after being cured for 1 day relative to the hardness after being cured for 7 days are shown in Table 1.

TABLE 1

|  |  | Example 1 | Example 2 | Example 3 | Example 4 | Example 5 | Comparative Example 1 | Comparative Example 2 |
|---|---|---|---|---|---|---|---|---|
| Terminal-Thiol Group-Containing Polymer | | Liquid Polysulfide Polymer of Synthetic Example 1 | Liquid Polysulfide Polymer of Synthetic Example 2 | Liquid Polysulfide Polymer of Synthetic Example 3 | Liquid Polysulfide Polymer of Synthetic Example 4 | Liquid Polysulfide Polymer of Synthetic Example 5 | Commercially Available Liquid Polysulfide Polymer | Commercially Available Liquid Polysulfide Polymer |
| SH Content (% by Weight) | | 10.0 | 9.5 | 10.2 | 12.1 | 15.6 | 6.5 | 12.0 |
| Viscosity (mPa·s) | | 302 | 370 | 430 | 325 | 226 | 1,220 | 13,900 |
| Weight Average Molecular Weight (Mw) | | 907 | 963 | 1,030 | 983 | 819 | 1,433 | 2,000 |
| Properties of Compound | | | | | | | | |
| Gel Time (Minute) | | 35 | 40 | 35 | 30 | 23 | 50 | 4 |
| Tack Free Time (Hour) | | 8 to 12 | 8 to 12 | 8 to 12 | 0.80 | 0.60 | 12 to 18 | 0.25 |
| Hardness (D) | After Being Cured for 1 Day | 29 | 28 | 33 | 36 | 36 | 1 | 50 |
| | After Being Cured for 3 Days | 45 | 48 | 52 | 41 | 39 | 30 | 73 |
| | After Being Cured for 7 Days | 52 | 55 | 60 | 42 | 40 | 59 | 75 |
| | Achievement Degree of Hardness at Day 1 Relative to Hardness at Day 7 | 56% | 51% | 55% | 86% | 90% | 2% | 67% |

As shown in Table 1, the curable composition had low viscosity before being cured, fast tack free time, and much high achievement degree of the hardness after being cured for 1 day relative to the hardness after being cured for 7 days, as compared to a composition using "Thiokol LP-3" of Comparative Example 1. The composition using "Polythiol QE-340M" of Comparative Example 2 had rather high viscosity before being cured, thus was hard to be used as it was. In addition, the composition of Comparative Example 2 had high hardness after 7 days, which showed low flexibility.

INDUSTRIAL APPLICABILITY

The curable composition is characterized by fast increase of the hardness during curing, having low viscosity, and having excellent flexibility, water resistance, chemical resistance and weather resistance, and is also good in adhesion. Thus, it can be used for an adhesive, sealant, potting material, coating material, modifier for resin, primer, and the like. The curable composition is optimally used particularly for an adhesive for civil engineering and construction, a coating material for civil engineering and construction, a primer for civil engineering and construction, an adhesive for electrical and electronic applications, a potting material for electrical and electronic applications, an adhesive for vehicles, and a primer for vehicles.

The invention claimed is:

1. A curable composition comprising a liquid polysulfide polymer containing 8% by weight or more of thiol groups in one molecule, an epoxy resin, and an amine, in which the liquid polysulfide polymer is

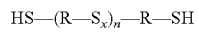

wherein 1) R is a two valent or three valent organic group containing a —O—CH$_2$—O— bond and a branched alkylene group, an average of n is less than 10, x is an integer of 1 to 5, and an average of x is 1 to 2.5, 2) the liquid polysulfide polymer has a viscosity of 900 mPa·s or less, 3) hardness D of the composition after curing for 7 days at 23° C. is 20 to 60, and 4) hardness D after curing for 1 day at 23° C. is 50 to 100% of the hardness after curing for 7 days at 23° C.

2. The curable composition according to claim 1, wherein the epoxy resin is contained in an amount of 100 to 600 parts by weight, based on 100 parts by weight of the liquid polysulfide polymer.

3. The curable composition according to claim 1, wherein the amine is contained in an amount of 1 to 60 parts by weight, based on 100 parts by weight of the epoxy resin.

* * * * *